Patented May 12, 1936

2,040,081

UNITED STATES PATENT OFFICE 2,040,081

AGGLOMERATING FINE PHOSPHATE ROCK

Harry A. Curtis, Knoxville, Tenn., assignor to Tennessee Valley Authority, Wilson Dam, Ala., a corporation of the United States No Drawing. Application September 21, 1934, Serial No. 744,943

5 Claims. (Cl. 23—108)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to the process of agglomerating fine phosphate rock, particularly in connection with its use as a constituent of reduction furnace charging stock for the manufacture of phosphorus and its compounds.

One of the objects of my invention is to provide a continuous means for the agglomeration of fine phosphate rock. Another object of this invention is to convert fine phosphate rock into aggregates suitable for use as a constituent of the charge for a blast or an electric reduction furnace.

Certain phosphate rock deposits, such as those in middle Tennessee, occur in irregular beds of varying thickness containing plate-like masses dispersed thru a matrix of fine phosphate rock, silica and clay. After the removal of the overburden, the entire bed containing the phosphatic material is removed and processed.

The ore, with its associated impurities, is washed and screened to separate the plate-like masses of phosphate rock from the matrix of fine rock, silica and clay. It is often necessary to pass the coarse material over a picking belt for further concentration of the rock by the separation of chert nodules and clay lumps. The plates so separated are suitable for incorporation in phosphorus reduction furnace charging stock after the reduction of the larger masses to the proper size, such as one-half to four inches in approximate diameter. The fine rock, silica and clay separated above are subjected to successive washings and other suitable treatment to separate the clay and silica.

Fine phosphate rock is produced either as a result of ore concentration or the mechanical handling and sizing of the larger masses of rock. In any event, it is desirable to provide some means of converting the fine phosphate rock into masses of suitable size for incorporation in phosphorus reduction furnace charging stock for the satisfactory operation of a blast or an electric furnace. Fine phosphate rock has been agglomerated by sintering or by briquetting but in either case the operation is expensive.

I have found that by mixing the fine phosphate rock with a small proportion of a mineral acid, such as phosphoric or sulphuric acid diluted with sufficient water to wet the rock surfaces, by intimately contacting the resulting mixture until a stiff paste results, by discharging the stiff paste into a rotary dryer, to make spheroidal masses and by drying the masses to the required moisture content, agglomerated masses suitable for inclusion along with carbon and silica in phosphorus reduction furnace charging stock may be prepared.

One example of the operation of my process is given for the treatment of fine phosphate rock with sulphuric acid: 100 parts by weight of fine brown phosphate rock of 10 to 100 mesh were mixed with 10 parts by weight of sulphuric acid in a 30% solution, the mixture pugged to a smooth putty-like mass, this mixture discharged into a rotary drier to make spheroidal masses and to dry these masses to the proper moisture content.

Another example of the functioning of my process is shown for the treatment of fine phosphate rock with dilute phosphoric acid: 100 parts by weight of fine brown phosphate rock of 10 to 100 mesh were mixed with 6 parts by weight of phosphoric acid in a 30% solution, the mixture pugged to a smooth putty-like mass, this mixture discharged into a rotary drier to make spheroidal masses and dry these masses to the proper moisture content.

The products obtained by both of the above treatments were of sufficient size and hardness to be suitable for incorporation in a furnace charge.

It is evident that there are numerous factors which will influence conditions for the most satisfactory operation of my process, the actual limits of which cannot be established except by a detailed study of each set of raw materials and finished products involved. In the case of the treatment of the fine brown phosphate rock, there are preferred operating limits which will be set forth. The fine phosphate rock should not be coarser than 10 mesh, with the best results obtained with material containing a substantial amount of 100 mesh rock. When sulphuric acid has been used, it has been found preferable to use 8 to 14 parts by weight of sulfuric acid in a solution of 30 to 50% concentration with each 100 parts by weight of phosphate rock treated. When phosphoric acid has been used, it has been found preferable to use 6 to 8 parts by weight of phosphoric acid in a 25 to 40% solution with each 100 parts by weight of phosphate rock treated. In any event, there must be sufficient acid solution to wet thoroughly the surface of the phosphate rock particles. The intimate contact of the rock and the acid solution may be made by any suitable means, one of which is a pugging mill. When the rock and acid are in the proper proportions, the mixture resulting from this intimate contacting will be in the form of a stiff, putty-like paste. This paste is then discharged into a rotary drier and forms into spheroidal masses. These masses harden rapidly and proceed through the dryer for a sufficient distance to remove the excess moisture to the maximum moisture content requirement. It will therefore be seen that this invention may be actually carried out by the modification of certain details without departing from its spirit or scope.

I claim:

1. Process of agglomerating fine phosphate rock, which comprises, pugging 100 parts by weight of the fine phosphate rock and 8 to 14 parts by weight of sulfuric acid, containing 30 to 50% by weight of $H_2SO_4$; and discharging the mixture into a rotary drier to form spheroidal masses and to dry the masses.

2. Process of agglomerating fine phosphate rock, which comprises, pugging 100 parts by weight of the fine phosphate rock and 6 to 8 parts by weight of phosphoric acid, containing 25 to 40% by weight of $H_3PO_4$; and discharging the mixture into a rotary drier to form spheroidal masses and to dry the masses.

3. Process of agglomerating fine phosphate rock, which comprises, pugging the fine phosphate rock and a diluted mineral acid selected from the group consisting of phosphoric acid, containing not more than 40% by weight of $H_3PO_4$, and sulfuric acid, containing not more than 50% by weight of $H_2SO_4$, with the diluted acid used in a sufficient quantity to effect agglomeration with the strength of the acid used; and discharging the mixture into a rotary drier to form spheroidal masses and to dry the masses.

4. Process of agglomerating fine phosphate rock, which comprises, pugging the fine phosphate rock and a diluted mineral acid selected from the group consisting of phosphoric acid, containing not more than 40% by weight of $H_3PO_4$, and sulfuric acid, containing not more than 50% by weight of $H_2SO_4$, with the diluted acid used in a sufficient quantity to effect agglomeration with the strength of the acid used; and continuing the mixing of the pugged mixture in a rotary type mixer, which will not crush the agglomerates as formed, until the mixture sets up in spheroidal masses; and drying the spheroidal masses.

5. Step in process of agglomerating fine phosphate rock, which comprises, forming spheroidal masses with a pugged mixture of the fine phosphate rock and a diluted mineral acid, selected from the group consisting of phosphoric acid, containing not more than 40% by weight of $H_3PO_4$, and sulfuric acid, containing not more than 50% by weight of $H_2SO_4$, in a rotary type mixer, which will not crush the agglomerates as formed, with the diluted acid used in a sufficient quantity to effect agglomeration with the strength of the acid use.

HARRY A. CURTIS.

CERTIFICATE OF CORRECTION.

Patent No. 2,040,081. May 12, 1936.

HARRY A. CURTIS.

It is hereby certified that error appears in the printed specification of the above numbered patent requiring correction as follows: Page 2, second column, line 21, for "with" read from; and that the said Letters Patent should be read with this correction therein that the same may conform to the record of the case in the Patent Office.

Signed and sealed this 21st day of July, A. D. 1936.

Henry Van Arsdale (Seal) Acting Commissioner of Patents.